United States Patent Office 3,449,274
Patented June 10, 1969

3,449,274
CURABLE, THIXOTROPIC COMPOSITIONS BASED ON CYCLOALIPHATIC DIEPOXIDES AND DIMERS OF UNSATURATED FATTY ACIDS
George A. Salensky, Metuchen, N.J., assignor to Union Carbide Corporation, a corporation of New York
No Drawing. Filed Apr. 4, 1967, Ser. No. 628,262
Int. Cl. C08g 30/12, 45/00, 51/04
U.S. Cl. 260—18    12 Claims

ABSTRACT OF THE DISCLOSURE

Curable, thixotropic compositions are suitable for use as automotive body solders on oil contaminated surfaces. Said composition comprises (1) an admixture of two cycloaliphatic diepoxides (2) dimerized fat acids (3) polycarboxylic anhydride (4) alkaline earth silicate (5) stannous acylate and (6) onium cation exchanged bentonite.

This invention relates to curable, thixotropic compositions based on cycloaliphatic diepoxides and dimers of unsaturated fatty acids and to cured products obtained therefrom. More particularly, this invention relates to curable compositions based on cycloaliphatic diepoxide and dimers of unsaturated fatty acids which are particularly desirable for use as body solders in automotive applications.

A problem of long standing with respect to body solders has been the loss of adhesion of such body solders from the objects to which they have been applied whenever the body solders are subjected to the thermal shock and/or are subjected to an impact. This loss of adhesion is accentuated in those instances wherein the body solder has been applied to an object contaminated by a material such as a lubricating oil.

The present invention provides curable, thixotropic compositions which when used as body solders and cured to infusible products have excellent adhesion to the objects to which they have been applied, including oil contaminated objects, and retain this adhesion even upon being subjected to thermal shock and/or an impact. The compositions of this invention can be readily compounded and used in coating, filling, painting, laminating and other such applications as they are free of such deficiencies as cratering, crawling, sagging and run-off, particularly from inclined surfaces. Also, the compositions of this invention have relatively fast cure and once cured to infusible products have excellent hot sanding and feathering properties. Also, these cured products, when painted over, exhibit excellent gloss characteristics, rendering that portion of a surface to which they have been applied indistinguishable from adjacent painted metal surfaces.

In further explanation of tests conducted with respect to compositions of this invention, the compositions were compounded at room temperature and used as a solder to mask the lap or coach joint of two panels. The lap or coach joint, joined by spot welds, was depressed about ¼ of an inch from the normal contour of the panels to allow for filling and masking of the joint by the solder. The resultant panels were then subjected to the tests described below.

Sag Test.—Panels were placed upright in an oven which was at a temperature of 350° F. and examined visually for any sag or run off until the solder cured to an infusible product.

Cure Speed Test.—Panels were placed upright in an oven which was at a temperature of 350° F. and the time within which the solder cure to an infusible product noted.

Hot Sanding and Feathering Test.—Panels were placed upright in an oven which was at a temperature of 350° F., removed from the oven when the solder cured to an infusible product and two minutes thereafter sanded using a 60 mesh disc and feathered using an 80 mesh disc.

Thermal Shock Test for Adhesion.—Panels were placed upright in an oven which was at a temperature of 350° F., removed from the oven after twenty minutes and quenched in cold tap water. This was repeated five times for each panel. Visual examination was then made of each panel in order to determine whether there was any loss of adhesion of the solder.

Cold Impact Strength.—Panels, treated as described for the Thermal Shock Test were cooled to −10° F. and maintained at −10° F. for three hours and then dropped on a concrete floor from a height of six feet. The panels were then examined visually in order to determine whether there was any loss of adhesion of the solder.

The curable, thixotropic compositions of this invention are a mixture comprising:

(a) Diepoxides of cycloaliphatic esters of dicarboxylic acids having the formula:

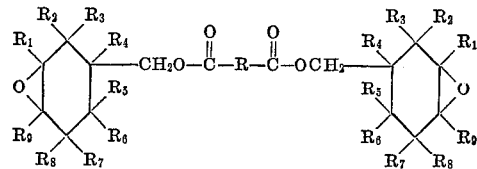

wherein $R_1$ through $R_9$, which can be the same or different are hydrogen or alkyl radicals generally containing 1 to 9 carbon atoms inclusive and preferably containing 1 to 3 carbon atoms inclusive as for example methyl, ethyl, n-propyl, n-butyl, n-hexyl, 2-ethylhexyl, n-octyl, n-nonyl and the like; R is a divalent hydrocarbon radical generally containing 3 to 9 carbon atoms inclusive and preferably containing 4 to 6 carbon atoms inclusive, as for example, alkylene radicals, such as trimethylene, tetramethylene, pentamethylene, hexamethylene, 2-ethyl hexamethylene, octamethylene, nonamethylene, and the like; cycloaliphatic radicals, such as 1,4-cyclohexane, 1,3-cyclohexane, 1,2-cyclohexane, and the like.

Among specific diepoxides of cycloaliphatic esters of dicarboxylic acids are the following:

bis(3,4-epoxycyclohexylmethyl)oxalate,
bis(3,4-epoxycyclohexylmethyl)adipate,
bis(3,4-epoxy-6-methylcyclohexylmethyl)adipate,
bis(3,4-epoxycyclohexylmethyl)pimelate, and the like. Other suitable compounds are described in U.S. Patent 2,750,395 to B. Phillips et al.

(b) A 3,4 - epoxycyclohexylmethyl 3,4 - epoxycyclohexane carboxylate having the formula:

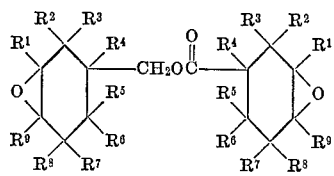

wherein $R^1$ through $R^9$ which can be the same or different are as defined for $R_1$ in (a).

Among specific compounds falling within the scope of the above formula are the following: 3,4-epoxycyclohexylmethyl, 3,4 - epoxycyclohexanecarboxylate, 3,4-epoxy-1-methylcyclohexylmethyl, 3,4-epoxy-1-methylcyclohexanecarboxylate, 6 - methyl - 3,4 - epoxycyclohexanecarboxylate, 3,4-epoxy-3-methylcyclohexylmethyl, 3,4 - epoxy-3-methylcyclohexanecarboxylate, 3,4 - epoxy - 5-methylcyclohexylmethyl, 3,4-epoxy - 5 - methylcyclohexanecarboxylate. Other suitable compounds are described in U.S. Patent 2,890,194 to B. Phillips et al.

(c) A dimer of an unsaturated monobasic fatty acid as for example dimers of acids having the formula:

$$(C_aH_{2a}-1)-COOH$$

wherein $\alpha$ is an integer having a value of 6 to 20 inclusive such as $\Delta^{9,10}$-decylenic acid, $\Delta^{9,10}$-dodecylenic acid, palmitoleic acid, oleic acid, petroselinic acid, vaccenic acid and the like and dimers of unsaturated acids having the formula:

$$(C_\beta H_{2\beta}-3)-COOH$$

wherein $\beta$ is an integer having a value of 6 to 20 inclusive such as linoleic acid and the like. Other suitable dimers are enumerated in U.S. Patent 2,994,660.

(d) Anhydrides of polybasic acids as for example, phthalic anhydride, tetrahydrophthalic anhydride, hexahydrophthalic anhydride, chlorendic anhydride, maleic anhydride, chloromaleic anhydride, dichloromaleic anhydride, glutaric anhydride, adipic anhydride, succinic anhydride, itaconic anhydride, heptyl succinic anhydride, hexylsuccinic anhydride, methylbutylsuccinic anhydride, methyltetrahydrophthalic anhydride, nonenylsuccinic anhydride, octenylsuccinic anhydride, pentenylsuccinic anhydride, propylsuccinic anhydride, 1,2,4,5-benzentetracarboxylic dianhydride, citraconic anhydride, 4-nitrophthalic anhydride, 1,2-naphthalic anhydride, 2,3-naphthalic anhydride, 1,8-naphthalic anhydride, tetrabromophthalic anhydride, and tetraiodophthalic anhydride. Also suitable are cyclopentanetetracarboxylic dianhydride, benzophenonetetracarboxydianhydride, trimellitic anhydride. Polymeric anhydrides or mixed polymeric anhydrides of sebacic, maleic, adipic, pimelic, terephthalic and isophthalic acids are also suitable. Other suitable anhydrides are enumerated in U.S. Patent 3,117,099 to Proops et al.

(e) Alkaline earth silicates such as calcium silicate and magnesium silicate, and preferably magnesium silicate (f) Stannous acylates having the formula:

$$Sn(O\overset{O}{\underset{\|}{C}}-R')_2$$

wherein R' is a monovalent hydrocarbon radical generally containing 2 to 12 carbon atoms inclusive and preferably containing 3 to 10 carbon atoms inclusive. Specific acylates falling within the scope of the formula above, wherein R' can be a saturated, unsaturated, branched or straight chain hydrocarbon radical, are: stannous propionate, stannous tartrate, stannous butyrate, stannous valerate, stannous caproate, stannous caprylate, stannous octoate, stannous laurate, stannous palmitate, stannous stearate, stannous oleate and the like.

(g) Cation exchanged bentonite. The cation exchanged bentonites are known compounds and are exemplified by those disclosed in U.S. Patent 2,531,427 which are onium cation exchanged bentonite. Other suitable bentonites are those disclosed in U.S. Patent 3,102,823 to J. P. Manasia et al. which are quaternary ammonium cation exchanged bentonite. Among suitable cation exchanged bentonites are dimethyldidodecylammonium bentonite, dimethyldihexadecylammonium bentonite, dimethylhexadecyloctadecylammonium bentonite, dimethyldioctadecylammonium bentonite and the like. Also suitable are the commercially available cation exchanged bentonites supplied by National Lead Co. under the designation "Bentone."

The amount of materials used to formulate the compositions of this invention are as follows:

(a) Diepoxides of cycloaliphatic esters of dicarboxylic acids—about ⅓ to about 3 equivalents and preferably about ½ to about 2 equivalents (based on the epoxy group) per equivalent of:

(b) A 3,4-epoxycyclohexylmethyl 3,4-epoxycyclohexanecarboxylate (based on the epoxy groups).

(c) Dimer of an unsaturated monobasic fatty acid—about 0.3 to about 0.6 and preferably about 0.4 to about 0.5 equivalent (based on the carboxy groups) per total epoxy equivalent.

(d) Anhydrides of polybasic acids—about 0.005 to about 0.2 and preferably about 0.02 to about 0.09 equivalents (based on the anhydride groups) per 100 parts by weight of dimer of an unsaturated monobasic fatty acid (c).

(e) Alkaline earth silicate—about 60 to about 140 and preferably about 80 to about 120 parts by weight per 100 parts by weight diepoxide [(a+b)] plus about 40 to about 110 and preferably about 58 to about 90 parts by weight per 100 parts by weight of dimer of an unsaturated monobasic fatty acid (c).

(f) Stannous acylate—about 3 to about 10 and preferably about 4 to about 8 parts by weight per 100 parts by weight of dimer of an unsaturated monobasic fatty acid (c).

(g) Cation exchanged bentonite—about 6 to about 14 and preferably about 8 to about 11 parts by weight per 100 parts by weight diepoxide [(a+b)] plus about 9 to about 16 and preferably about 11 to about 15 parts by weight per 100 parts by weight dimer of an unsaturated monobasic fatty acid.

In formulating the compositions of this invention, it is convenient, from a processing standpoint, to prepare a so-called resin portion and a so-called hardener portion and then blend the two portions together in a paste mixer at room temperature. A typical resin portion and a typical hardener portion are indicated below.

Resin portion:
 Diepoxide of a cycloaliphatic ester of a dicarboxylic acid
 A 3,4-epoxycyclohexylmethyl 3,4-epoxy cyclohexane carboxylate
 Cation exchanged bentonite
 Alkaline earth silicate Hardener portion:
 Dimer of an unsaturated monobasic fatty acid
 Cation exchanged bentonite
 Alkaline earth silicate
 Anhydride of a polybasic acid
 A stannous acylate It is to be understood that there may be added to these compositions, through the resin portion or through the hardener portion, such additives as pigments such as carbon black and the like, processing aids such as propylene carbonate, accelerators such as borontrifluoride or complexes thereof and the like in amounts well known to those skilled in the art.

The compositions of this invention, as previously indicated have excellent cure speed, on the order of less than about 10 minutes at 350° F. The curing cycle in each case will depend in part upon the exact formulation of the composition as well as the temperature to which the compositions are subjected. At room temperature, about 78° F., the compositions of this invention remain stable for a period of time in excess of 24 hours.

The following examples further illustrate the present invention and are not intended to limit the scope thereof in any manner.

EXAMPLE 1

A composition was formulated by blending the ingredients of a "resin portion" and a "hardener portion," applied to the lap joint of two steel panels which had been contaminated with lubricating oil and subjected to the tests previously described.

|  | Parts by weight | Equivalents |
|---|---|---|
| Resin portion: | | |
| Bis(3,4-epoxy-6-methylcyclohexyl methyl) adipate-assay=216 gm./gm. mole epoxy | 12.16 | 0.0563 |
| 3,4-epoxycyclohexylmethyl, 3,4-epoxycyclohexane carboxylate-assay=131 gm./gm. mole epoxy | 14.86 | 0.1135 |
| Dimethyldioctadecyl ammonium bentonite | 2.53 | |
| Talc (magnesium silicate) | 27.01 | |
| Propylene carbonate | 0.81 | |
| Carbon black | 0.03 | |
| Hardener portion: | | |
| Dimer of linoleic acid | 20.82 | 0.074 |
| Dimethyldioctadecylammonium bentonite | 2.70 | |
| Talc (magnesium silicate) | 15.36 | |
| Hexahydrophthalic anhydride | 1.77 | 0.0115 |
| Stannous octoate | 1.17 | |
| Propylene carbonate | 0.78 | |

This composition was thixotropic, did not sag and cured in 8 minutes at 350° F. to an infusible product. The cured product had excellent hot sanding and feathering properties, had excellent adhesion as it did not pull away from the panel when subjected to the Thermal Shock Test and had excellent impact strength as it did not lose adhesion on being dropped from a height of six feet as described in the Cold Impact Test.

EXAMPLE 2

A second composition was formulated by blending the ingredients of a "resin portion" and a "hardener portion," applied to the lap joint of two steel panels which had been contaminated with lubricating oil and subjected to the tests previously described.

|  | Parts by weight | Equivalents |
|---|---|---|
| Resin portion: | | |
| Bis(3,4-epoxy-6-methylcyclohexyl-methyl) adipate | 21.70 | 0.100 |
| 3,4-epoxycyclohexylmethyl, 3,4-epoxy-cyclohexane carboxylate | 6.59 | 0.050 |
| Dimethyldioctadecyl ammonium bentonite | 2.62 | |
| Talc (magnesium silicate) | 28.35 | |
| Propylene carbonate | 0.91 | |
| Carbon black | 0.03 | |
| Hardener portion: | | |
| Dimer of linoleic acid | 20.40 | 0.0725 |
| Dimethyldioctadecyl ammonium bentonite | 2.48 | |
| Talc (magnesium silicate) | 13.75 | |
| Hexahydrophthalic anhydride | 1.06 | 0.007 |
| Stannous octoate | 1.30 | |
| Propylene carbonate | 0.81 | |

This composition was thixotropic, did not sag and cured in 8 minutes at 350° F. to an infusible product. The cured product had excellent hot sanding and feathering properties, had excellent adhesion as it did not pull away from the panel when subjected to the Thermal Shock Test and had excellent impact strength as it did not lose adhesion on being dropped from a height of six feet as described in the Cold Impact Test.

EXAMPLE 3

This composition was formulated with the same materials as described for the composition of Example 1 with the exception that the composition of this example contained 0.007 anhydride equivalents of benzophenone tetracarboxylic acid dianhydride.

This composition cured to an infusible product in 5 minutes at a temperature of 350° F. and its properties were comparable to the properties of the composition of Example 1.

In order to further show the excellent properties of the compositions of this invention, two compositions were formulated, control 1 and control 2, applied as a solder and tested as described for the composition of Example 1.

Control 1 was the same as the composition of Example 1 with the exception that it contained 36.7 parts by weight bis(3,4-epoxy-6-methyl cyclohexyl methyl)adipate 0.17 epoxy equivalents and did not contain any carboxylate (b).

Control II was the same as the composition of Example 1 with the exception that it contained 22.2 parts by weight 3,4-epoxycyclohexylmethyl 3,4 - epoxy - cyclohexane carboxylate 0.17 epoxy equivalents and did not contain any diepoxide of a cycloaliphatic ester of a dicarboxylic acid (a).

Control I had exceedingly poor sanding properties.

Control II failed the thermal shock test as it underwent a loss of adhesion.

It is to be understood that the mixtures of materials can be utilized in formulating the compositions of this invention.

Also, the disclosure of all references noted in this application are incorporated herein by reference.

What is claimed is:
1. A curable composition comprising:
(a) about ⅓ to about 3 equivalents of a diepoxide of a cycloaliphatic ester of a dicarboxylic acid having the formula:

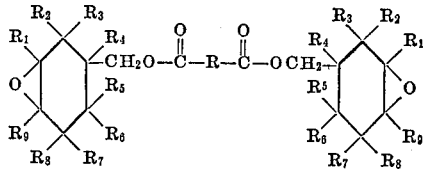

wherein $R_1$ through $R_9$ are hydrogen or alkyl radicals containing 1 to 9 carbon atoms inclusive and R is a divalent hydrocarbon radical containing 3 to 9 carbon atoms inclusive, per equivalent of
(b) a carboxylate having the formula:

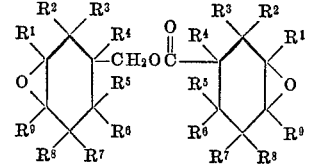

wherein $R^1$ through $R^9$ are as defined for $R_1$,
(c) a dimer of an unsaturated monobasic fatty acid in an amount of about 0.3 to about 0.6 equilavent per total epoxy equivalent;
(d) an anhydride of a polybasic acid in an amount of about 0.005 to about 0.2 equivalent per 100 parts by weight of (c);
(e) alkaline earth silicate in an amount about 60 to about 140 parts by weight per 100 parts by weight of (a)+(b) plus about 40 to about 110 parts by weight per 100 parts by weight of (c);
(f) stannous acylate in an amount of about 3 to about 10 parts by weight per 100 parts by weight (c);
(g) onium cation exchanged bentonite in an amount of about 6 to about 14 parts by weight per 100 parts by weight of (a)+(b) plus about 9 to about 16 parts by weight per 100 parts by weight (c).

2. A curable composition as defined in claim 1 comprising: about ½ to about 2 equivalent of (a) per equivalent of (b); an amount of (c) of about 0.4 to about 0.5 equivalent per total epoxy equivalent; an amount of (d) of about 0.02 equivalents to about 0.09 equivalent per 100 parts by weight (c); an amount of (e) of about 80 to about 120 parts by weight per 100 parts by weight of (a)+(b) plus about 58 to about 90 parts by weight per 100 parts by weight of (c); an amount of (f) of about 4 to about 8 parts by weight per 100 parts by weight of (c); an amount of (g) of about 8 to about 11 parts by weight per 100 parts by weight (a)+(b) and plus about 11 parts to about 15 parts by weight per 100 parts by weight of (c).

3. The cured product of the composition defined in claim 1.

4. A composition as defined in claim 1 wherein (a) is bis(3,4-epoxy-6-methyl cyclohexylmethyl)adipate.

5. A composition as defined in claim 1 wherein (b) is 3,4 - epoxycyclohexylmethyl 3,4 - epoxycyclohexane carboxylate.

6. A composition as defined in claim 1 wherein (c) is the dimer of linoleic acid.

7. A composition as defined in claim 1 where (d) is hexahydrophthalic anhydride.

8. A composition as defined in claim 1 wherein (d) is a mixture of hexahydrophthalic anhydride and benzophenonetetracarboxylic acid dianhydride.

9. A composition as defined in claim 1 wherein (f) is stannous octoate.

10. A composition as defined in claim 1 wherein (g) is dimethyldioctadecylammonium bentonite.

11. A composition as defined in claim 1 wherein the alkaline earth silicate is magnesium silicate.

12. A composition as defined in claim 1 wherein the bentonite is a quaternary ammonium cation exchanged bentonite.

References Cited

UNITED STATES PATENTS

| | | | |
|---|---|---|---|
| 3,344,096 | 9/1967 | Manasia et al. | 260—18 |
| 2,970,231 | 1/1961 | Rogers et al. | 260—18 |
| 2,928,809 | 3/1960 | Hicks et al. | 260—18 |
| 2,768,992 | 10/1956 | Zukas | 260—37 X |

DONALD E. CZAJA, *Primary Examiner.*

C. W. IVY, *Assistant Examiner.*

U.S. Cl. X.R.

117—132; 260—37, 78.4, 830